(12) United States Patent
Grauss et al.

(10) Patent No.: US 11,879,512 B2
(45) Date of Patent: Jan. 23, 2024

(54) WHEEL HUB DRIVE FOR A VEHICLE

(71) Applicant: Schaeffler Technologies AG & Co. KG, Herzogenaurach (DE)

(72) Inventors: Aurelien Grauss, Mommenheim (FR); Philippe Wagner, Souffelweyersheim (FR); Simon Ortmann, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 263 days.

(21) Appl. No.: 17/424,686

(22) PCT Filed: Dec. 11, 2019

(86) PCT No.: PCT/DE2019/101071
§ 371 (c)(1),
(2) Date: Jul. 21, 2021

(87) PCT Pub. No.: WO2020/151777
PCT Pub. Date: Jul. 30, 2020

(65) Prior Publication Data
US 2022/0106992 A1    Apr. 7, 2022

(30) Foreign Application Priority Data
Jan. 25, 2019 (DE) .......................... 102019101818.8

(51) Int. Cl.
*F16D 65/18* (2006.01)
*F16D 65/50* (2006.01)
(Continued)

(52) U.S. Cl.
CPC ........... *F16D 65/186* (2013.01); *F16D 65/50* (2013.01); *H02K 7/102* (2013.01); *F16D 2125/34* (2013.01)

(58) Field of Classification Search
CPC ........ F16D 65/40; F16D 65/50; F16D 65/186; F16D 2125/34; F16D 2121/02;
(Continued)

(56) References Cited

U.S. PATENT DOCUMENTS 3,485,329 A * 12/1969 Hauser .................... B60T 1/062
188/72.8
2007/0151826 A1* 7/2007 Ishii .................... F16H 63/3026
192/221

(Continued)

FOREIGN PATENT DOCUMENTS

DE 10225038 12/2003
DE 10131817 1/2008
(Continued)

Primary Examiner — Robert A. Siconolfi
Assistant Examiner — San M Aung
(74) Attorney, Agent, or Firm — Volpe Koenig

(57) ABSTRACT

A wheel hub drive for a vehicle, having: a drive housing; a hub output mounted rotatably relative to the drive housing; a wheel brake for the hub output that has a stationary and a rotating braking partner, the stationary braking partner being connected to the drive housing for conjoint rotation therewith, and the rotating braking partner being connected to the hub output. The two braking partners are frictionally connected in a braking state, A parking brake for fixing the hub output relative to the drive housing. The stationary and rotating brake partners being movable relative to one another when the parking brake is actuated and being frictionally connected to one another in a parked state. The has a ramp mechanism for converting a rotary movement into a linear movement in order to transfer a parking force to the stationary and/or rotating brake partner.

17 Claims, 3 Drawing Sheets

(51) Int. Cl.
*H02K 7/102* (2006.01)
*F16D 125/34* (2012.01)

(58) Field of Classification Search
CPC ............. F16D 2121/14; F16D 2123/00; F16D 2125/38; F16D 2125/64; B60T 1/005; B60T 1/062; B60Y 2200/15; B60L 2220/46; B66F 9/24; B66F 9/07531; B60K 7/0007; B60K 17/046; B60K 2007/0046; B60K 2007/0061
USPC ........................................................ 188/158
See application file for complete search history.

(56) References Cited

U.S. PATENT DOCUMENTS

2009/0277727 A1* 11/2009 Ueno ................... B60K 17/046
188/71.5
2015/0026865 A1 1/2015 Westmoreland et al.

FOREIGN PATENT DOCUMENTS

| DE | 102013202809 | 9/2013 |
| JP | 2005263140 | 9/2005 |
| JP | 5352869 | 9/2013 |
| WO | 2017179670 | 10/2017 |

\* cited by examiner

WHEEL HUB DRIVE FOR A VEHICLE

CROSS-REFERENCE TO RELATED APPLICATIONS

This application is the U.S. National Phase of PCT Appln. No. PCT/DE2019/101071, filed Dec. 11, 2019, which claims priority to DE 102019101818.8, filed Jan. 25, 2019, the entire disclosures of which are incorporated by reference herein.

TECHNICAL FIELD

The disclosure relates to a wheel hub drive for a vehicle. The disclosure also relates to an axle arrangement having such wheel hub drives.

Wheel hub drives each have their own electric motor and are used to drive the wheels of a vehicle individually. Usually two such wheel hub drives are installed per axle of the vehicle. The main function of such wheel hub drives is to provide a drive torque for the vehicle. In many vehicle situations, however, the vehicle not only has to be driven, but also braked. For this purpose, wheel hub drives additionally have brakes which, in some embodiments, are integrated in the wheel hub drives.

The document DE 101 31 817 A1, which probably forms the closest prior art, discloses a wheel hub drive having a pneumatically operated brake and an electric motor, the brake being a multi-disc brake, the brake discs of which are axially displaceable between a pressure plate and a support plate, and at least one pneumatic piston and at least one spring-loaded piston acting on the pressure plate and being controllable independently of one another.

SUMMARY

It is the object of the present disclosure to propose a wheel hub drive for a vehicle which is characterized by a simple and robust parking brake.

This object is achieved by a wheel hub drive and by an axle arrangement having one or more of the features disclosed herein. Preferred or advantageous embodiments result from the claims, the following description, and the attached figures.

The disclosure relates to a wheel hub drive which is suitable and/or designed for a vehicle. The wheel hub drive is preferably designed to drive the wheels of a vehicle individually. The vehicle is designed, for example, as a passenger car, truck or the like. In particular, the wheel hub drive is used to provide a main drive torque for the vehicle. On the vehicle, for example, two such wheel drives can be arranged on a common axle or, for example, four such wheel drives can be distributed over two axles.

The wheel hub drive has a drive housing. The drive housing is preferably arranged and/or can be arranged in a rotationally fixed manner in the vehicle. For example, the wheel hub drive is arranged together with a driven wheel in the vehicle. In particular, the wheel hub drive is implemented as a direct drive.

The wheel hub drive has a hub output for coupling to the driven wheel. The hub output can be connected directly to the driven wheel and/or for conjoint rotation therewith. Alternatively to this, a gear section can be provided between the hub output and the driven wheel. The hub output is rotatably mounted relative to the drive housing. Particularly preferably, a bearing device for supporting the hub output is provided between the hub output and the drive housing. In particular, the hub output is mounted on the drive housing.

The wheel hub drive preferably has an electric motor, the electric motor comprising a rotor and a stator. The stator is connected to the drive housing for conjoint rotation therewith, and the rotor is connected to the hub output in a geared manner in order to conduct a drive torque from the electric motor via the hub output to the driven wheel. For example, the rotor can be connected to the hub output for conjoint rotation therewith. Alternatively, a further gear section can be provided between the rotor and the hub output.

The wheel hub drive has a wheel brake device, the wheel brake device serving to brake the driven wheel. The wheel brake device particularly preferably acts on the hub output, so that the driven wheel is braked via the hub output. The wheel brake device is particularly preferably designed as a mechanical and/or frictional wheel brake device, the braking torque being generated via friction.

The wheel brake device has a stationary brake partner and a rotating brake partner. In particular, at least one or exactly one of the two brake partners can have a friction lining. The stationary brake partner is connected to the drive housing for conjoint rotation therewith, and the rotating brake partner is connected to the hub output in a geared manner and/or for conjoint rotation therewith. In particular, the wheel brake device is designed as a wheel brake device integrated in the wheel hub drive. Particularly preferably, the stationary and/or the rotating brake partner is mounted such that it can be displaced at least in sections in the axial direction with respect to a main axis.

When the wheel brake device is actuated, the stationary brake partner and the rotating brake partner can be moved relative to one another and are frictionally connected to one another in a braking state. It is thus possible to brake the hub output and thus the driven wheel by actuating the wheel brake device. In addition, the electric motor can optionally be switched to generator mode and thus act as a regenerative brake.

The wheel hub drive has a parking brake device for fixing the hub output relative to the drive housing. In particular, the parking brake device assumes the function of a preferably conventional/prior hand brake device. In particular, the parking brake device is designed as a parking brake device integrated in the wheel hub drive. The parking brake device can particularly preferably be actuated independently of the wheel brake device.

When the parking brake device is actuated, the stationary brake partner and the rotating brake partner can be moved relative to one another and are frictionally connected to one another in a parking state. It is thus possible to fix the hub output and thus the driven wheel by actuating the parking brake device. Thus, for example, to secure the vehicle at a standstill, the parking brake device can be activated independently of the wheel brake device and, when the vehicle is traveling, the wheel brake device can be actuated independently of the parking brake device to brake the vehicle.

When the wheel brake device or the parking brake device is actuated, at least one of the two brake partners is displaced in the axial direction with respect to the main axis in the direction of the other brake partner so that the frictional connection is formed between the two brake partners. When the wheel brake device or the parking brake device is released, the frictional connection between the two brake partners is canceled so that the hub output can drive the wheel.

In the context of the disclosure it is proposed that the parking brake device has a ramp mechanism, the ramp mechanism converting a rotary movement into a linear movement in order to transfer a parking force to the rotating and/or stationary brake partner. In particular, the parking brake device is designed as a rotation-linear converter. Preferably, the ramp mechanism converts a rotary movement directed about the main axis into a linear movement directed along the main axis. In other words, a rotary movement introduced into the parking brake device is converted into a linear movement derived from the parking brake device. In particular, the two brake partners are moved relative to one another by the linear movement. Particularly preferably, both the wheel brake device and the parking brake device act on the same brake partner.

The advantage of the disclosure is that a simple and robust implementation of the parking brake device is implemented by the ramp mechanism. In addition, the ramp mechanism can be used to convert a rotary movement into a linear movement in a simple manner. Thus, the parking brake device can be actuated, for example, by a rotary movement and the parking brake device, for example, can be made much simpler and cheaper. The parking brake device ensures that the car does not roll away when parking and can also serve as an emergency brake, for example. The additional parking brake device in the wheel hub drive adds a function that is similar to the standard handbrake function of conventional vehicles.

In a preferred, structural embodiment of the disclosure, the ramp mechanism has a stationary and a rotatable ramp section. The stationary and/or the rotatable ramp section are preferably annular and/or cylindrical. In particular, the stationary and the rotatable ramp section are arranged coaxially and/or concentrically to one another. The two ramp sections are particularly preferably movement-coupled to one another so that a movement, in particular the rotary movement, of the one ramp section inevitably results in a movement, in particular the linear movement, of the other ramp section.

The stationary ramp section is non-rotatably connected to the drive housing and/or formed thereby. In particular, the stationary ramp section is form-fittingly and/or force-fittingly and/or materially connected to the drive housing. Alternatively, the stationary ramp section and the drive housing can be manufactured from a common semi-finished product in terms of production engineering, so that the ramp section is, for example, integrally connected to the drive housing or forms part of the drive housing.

To implement the rotary movement, the rotatable ramp section can be rotated about the main axis relative to the stationary ramp section. When the rotatable ramp section is rotated, the linear movement can simultaneously be transmitted via the ramp mechanism to at least one or exactly one of the two ramp sections. The stationary ramp section preferably remains stationary on the drive housing during the rotation in the direction of rotation and/or in the axial direction. The stationary ramp section is particularly preferably firmly connected to the drive housing, the rotatable ramp section simultaneously converting the rotary movement and the linear movement.

In a preferred development of the disclosure, one of the two ramp sections has a first helical toothing on its inner circumference and the other of the two ramp sections has a second helical toothing on its outer circumference. The stationary and/or the rotatable ramp section can preferably be designed as a toothed ring or geared ring. To form the ramp mechanism, the two ramp sections are in engagement with one another via the helical toothing. In particular, the first and second helical toothing are formed by multiple ramps, in particular bars, which are distributed in an alternating arrangement in the circumferential direction and run at an angle to the main axis. In particular, the one ramp section is received in a form-fitting manner in the other ramp section, in particular in the radial direction with respect to the main axis. When the rotatable ramp section is rotated, the two ramp sections are displaced relative to one another along the main axis due to the helical toothing, so that at least one of the two ramp sections is moved in the axial direction and/or is positively guided.

In a preferred development it is provided that the ramp mechanism has a fixing section which is designed and/or designed to fix the stationary ramp section on the drive housing. In particular, the fixing section is designed as a further toothed ring and/or geared ring. The fixing section is preferably arranged coaxially and/or concentrically to at least the stationary ramp section.

The fixing section is mounted on the drive housing. The fixing section is particularly preferably connected to the drive housing in a form-fitting and/or force-fitting and/or materially fitting in the radial and/or axial direction and/or in the circumferential direction with respect to the main axis. In particular, the drive housing has a housing cover which delimits or closes the drive housing on one side at least in the axial direction. The fixing section is preferably arranged on the housing cover. For this purpose, the fixing section can have at least one fastening tab, the fixing section being connected to the drive housing, in particular the housing cover, by at least one fastening means via the fixing tab.

The stationary ramp section and the fixing section are each in engagement with one another via a straight toothing. In particular, the stationary ramp section is arranged at least in a rotationally fixed manner on the fixing section via the straight toothing in the circumferential direction. In particular, the straight toothing can be designed as a plug-in toothing. Optionally, the stationary ramp section has a radially outwardly or inwardly directed collar, the ramp section being arranged with the collar in the axial direction with respect to the main axis between the fixing section and the drive housing at least in a form-fitting manner. This ensures that the ramp section is also fixed in the axial direction with respect to the main axis.

It is preferred that the wheel brake device has a pressure pad which is designed and/or suitable for transmitting a braking force. In particular, the pressure pad is arranged coaxially to the main axis and can be displaced in an axial direction in order to transfer the braking force. An end stop for the pressure pad is defined in the axial direction in relation to the main axis by at least or precisely one of the brake partners and in the opposite axial direction by at least one or exactly one of the ramp sections. In particular, the pressure pad is supported in the axial direction on the end stop formed by the stationary or the rotating brake partner and/or is firmly connected thereto. Alternatively or optionally additionally, the pressure pad is supported in the opposite axial direction on the end stop formed by the rotatable or the stationary brake partner and/or firmly connected thereto.

An axial position of the end stop formed by the ramp section can be adjusted via the ramp mechanism, so that wear readjustment is implemented for the wheel brake device. In particular, a restoring force can be applied to the pressure pad in the opposite axial direction, for example by means of a return spring or a fluid pressure, the pressure pad being automatically reset in the direction of the corresponding end stop in a non-actuated state of the wheel brake device and/or the wheel brake device being held in an open state. The two ramp sections are particularly preferably blocked in a non-actuated state of the parking brake device. This prevents undesired movement between the two ramp sections when the restoring force is applied to the ramp section forming the end stop. In particular, the end stop formed by the ramp section can be shifted in the axial direction with respect to the main axis by the parking brake device for wear readjustment in order to compensate for any wear that may have occurred on the rotating and/or stationary brake partner.

In a further specification, it is provided that the wheel brake device has a wheel brake actuation device. The wheel brake actuation device can be designed, for example, as a hydraulic wheel brake actuator which acts in the axial direction and acts on at least one of the two brake partners via the pressure pad so that the two brake partners are compressed in the axial direction with respect to the main axis in order to generate a braking torque.

It is also provided that the parking brake device has a parking actuation device, the parking actuation device being actuatable independently of the wheel brake actuation device. In particular, the parking actuation device is operatively connected to the rotatable ramp section, the parking actuation device being designed and/or suitable for generating the rotary movement.

In one possible embodiment of the disclosure, the parking actuation device is designed as a manual parking actuation device which can be actuated by a driver, for example, via a cable pull.

In an alternative embodiment of the disclosure, the parking actuation device has a parking actuator, for example a hydraulic or electromotive parking actuator, the parking actuator actuating the parking brake device with external energy. The parking actuator can be integrated in the wheel drive; alternatively, the parking actuator can actuate the parking brake device via a cable or a transmission.

In a further preferred embodiment, it is provided that the rotating brake partner is designed as at least one or exactly one axially movable brake disc or comprises it. In particular, the rotating brake partner has an outer carrier, the brake disc being connected to the outer carrier such that it can be displaced in the axial direction and rotatably in the direction of rotation. Alternatively or optionally additionally, it is provided that the stationary brake partner is designed as at least one or exactly one axially movable brake pad or comprises it. In particular, the stationary brake partner has an inner carrier, the brake pad being connected to the inner carrier such that it can be displaced in the axial direction and rotatably in the direction of rotation. It is structurally preferred that the outer carrier carries exactly one brake disc and/or the inner carrier carries exactly two brake pads which are arranged on both sides of the brake disc. It is preferably provided that the pressure pad and/or one of the two ramp sections, preferably the rotatable ramp section, are supported on one of the two brake pads.

Alternatively, the wheel brake device can be configured as a multi-disc brake device, the outer carrier being configured as an outer disc carrier and the inner carrier being configured as an inner disc carrier. One or more outer discs, preferably as the brake disc, can be arranged in the outer disc carrier. One or more inner discs, preferably as the brake pad, can be arranged in the inner disc carrier. When the wheel brake device is actuated, the braking force is transmitted, or when the parking device is actuated, the parking force is transmitted in the axial direction to the inner discs, so that a disc pack comprising the inner discs and the outer disc(s) are compressed in the axial direction to generate a braking torque or a parking torque.

Another object of the disclosure relates to an axle for a vehicle or a vehicle having the axle, the axle having two of the wheel hub drives, as described above. It can be provided that the parking actuation device is designed as a common parking actuation device for both wheel hub drives and in particular for both parking brake devices of both wheel hub drives.

BRIEF DESCRIPTION OF THE DRAWINGS

Further features, advantages and effects of the disclosure result from the following description of preferred exemplary embodiments of the disclosure and the attached figures. In the figures.

DETAILED DESCRIPTION

Figure 1:
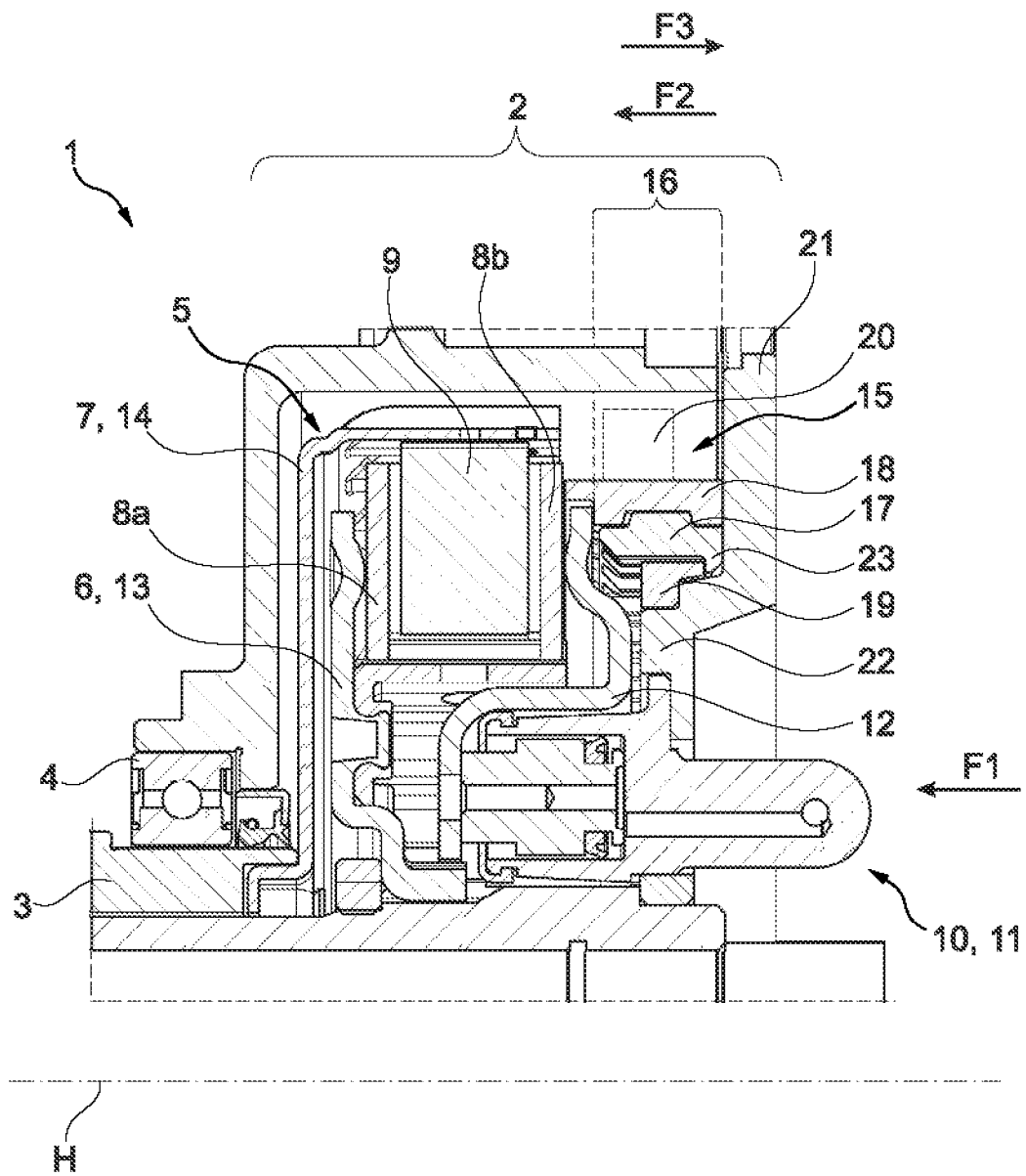
FIG. 1 shows a schematic, three-dimensional sectional view of a wheel hub drive as an exemplary embodiment.

FIG. 1 shows, in a schematic, three-dimensional sectional view along a main axis H, a wheel hub drive 1 as an exemplary embodiment. The wheel hub drive 1 is designed as a drive motor for an individually driven wheel of a vehicle (not shown).

The wheel hub drive 1 has a drive housing 2, shown only in sections, which is received in the vehicle for conjoint rotation. Furthermore, a hub output 3 is provided coaxially to the main axis H, the hub output 3 being rotatably supported in the drive housing 2 via a bearing device 4. For example, an electric motor (not shown) is connected on the stator side to the drive housing 2 for conjoint rotation and rotatably connected to the hub output 3 on the rotor side. The electric motor generates a drive torque which is transferred to the driven wheel via the hub output 3.

A wheel brake device 5 is arranged, in particular integrated, in the drive housing 2. The wheel brake device 5 has an inner carrier 6 and an outer carrier 7. In this exemplary embodiment, the inner carrier 6 is designed as a sheet metal construction which is coupled to the drive housing 3 for conjoint rotation. On the inner carrier 6, two brake pads 8a, b are arranged such that they can be axially displaced relative to one another. A brake disc 9 is arranged on the outer carrier 7, preferably axially displaceable between the two brake pads 8a, b and inserted for conjoint rotation and/or in a form-fitting manner about the main axis H.

The wheel brake device 5 has a wheel brake actuation device 10, which is designed as a hydraulic wheel brake actuator. The wheel brake actuation device 10 has at least one hydraulic wheel brake actuator 11 as a wheel brake actuation device 10, which acts in the axial direction and applies a braking force F1 to a cylindrical pressure pad 12 in the axial direction. When the wheel brake actuation device 10 is actuated, the pressure pad 12 is displaced in the axial direction in order to compress the two brake pads 8a, b and the brake disc 9 in the axial direction, so that a braking torque is generated.

In this embodiment, the inner carrier 6 with the two brake pads 8a, b forms a stationary brake partner 13 and the outer carrier 7 with the brake disc 9 forms a rotating brake partner 14.

Furthermore, a parking brake device 15 is arranged in the drive housing 2, the parking brake device 15 having a ramp mechanism 16 for converting a rotary movement about the main axis H into a linear movement along the main axis H. For this purpose, the ramp mechanism 16 has a stationary ramp section 17 and a rotatable ramp section 18 which can be rotated about the main axis H in order to implement the rotary movement relative to the stationary ramp section 17. The two ramp sections 17, 18 are each designed in an annular manner and are arranged coaxially and/or concentrically to one another with respect to the main axis H. The stationary ramp section 17 is arranged radially in the rotatable ramp section 18 and is in operative connection with the stationary ramp section 17 via the ramp mechanism 15 such that when the ramp section 18 is rotated, it executes the linear movement in the axial direction with respect to the main axis H. A parking force F2 is applied to the brake pads 8a, b and pressed together with the brake disc 9 so that a parking torque is generated.

The parking brake device 15 has a separate parking actuation device 20 (indicated schematically), the parking actuation device 20 being designed to generate and/or transfer the rotary movement and being connected to the rotatable ramp section 18 in terms of drive and/or transmission technology. For example, the parking actuator 20 can be formed as a cable, a worm gear or a hydraulic actuation actuator, e.g., a hydraulic cylinder. The rotatable ramp section 18 is supported in the axial direction with respect to the main axis H and via the pressure pad 12 on the brake pad 8b. To fix the vehicle wheel, the rotatable ramp section 18 is rotated with the aid of the parking actuation device 20, the rotatable ramp section 18 at the same time being moved axially by the ramp mechanism 16 and thus the pressure pad 12 being able to be actuated by the parking actuation device 15 independently of the wheel brake actuation device 10. With this structure, the wheel brake actuation device 10 and the parking actuation device 15 can be actuated independently of one another. In normal operation, the wheel brake actuation device 10 is used to brake the driven wheel 2 when the vehicle is traveling. In contrast, the parking actuator 15 is used to fix the driven wheel 2 when parking the vehicle.

The stationary ramp section 17 is connected to the drive housing 2 via an annular fixing section 19. The drive housing 2 has a housing cover 21, which closes the drive housing 2 in the axial direction with respect to the main axis H. The fixing section 19 is arranged coaxially to the main axis H and is firmly connected to the housing cover 21. For this purpose, the housing cover 21 has a receiving section 22, which in the exemplary embodiment shown is designed as a cylindrical extension. The fixing section 19 is positively received on the receiving section 22 and is connected to the housing cover 21, for example via a screw connection. In addition, the rotatable ramp section 17 has a radially inwardly directed collar section 23, the collar section 23 being held in a form-fitting manner in the axial direction with respect to the main axis H between the fixing section 19 and the housing cover 21. An axial securing of the stationary ramp section 17 is thus also implemented.

Furthermore, the parking brake device 15 can serve to adjust the wear of the wheel brake device 5. For this purpose, the rotatable ramp section 18 can be precisely positioned axially by the parking actuation device 20 and the ramp mechanism 16, the ramp section 18 simultaneously serving as a support surface for the pressure pad 12. An axial end stop for the pressure pad 12 is thus formed, the pressure pad 12 resting against the end stop when the wheel brake device 5 and the parking brake device 15 are in an open state. This end stop formed by the ramp section 18 or the exact axial position of the ramp section 18 can be stored in the parking brake device 15 for setting the wear readjustment if the parking actuation device 20 is self-locking. For example, a restoring element, such as a plate spring or a compression spring assembly, is provided to generate a restoring force F3 in order to push the pressure pad 12 back in the direction of the end stop formed by the stationary ramp section 23. This ensures that the wheel brake device 5 opens again completely after actuation.

Figure 2A:
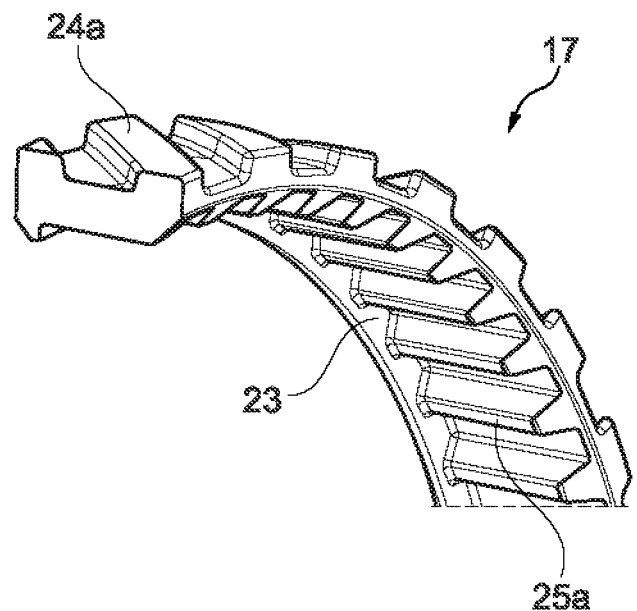
FIGS. 2A and 2B show a three-dimensional detailed view of a stationary and a rotatable ramp section of the wheel hub drive in FIG. 1.
Figure 2B:
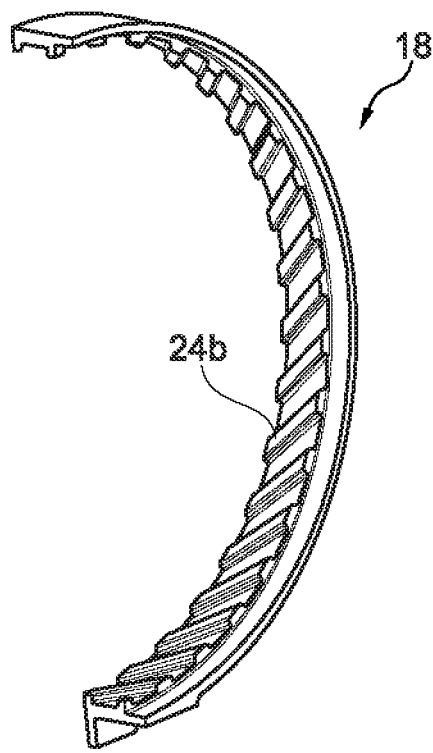

FIG. 2A shows the stationary ramp section 17 in a perspective detailed view. FIG. 2B shows the rotatable ramp section 18 in a perspective detailed view. The two ramp sections 17, 18 are each designed as a toothed ring. To form the ramp mechanism 16, as shown in FIG. 1, the stationary ramp section 17 on its outer circumference and the rotatable ramp section 18 on its inner circumference each have a helical toothing 24a, b, the two ramp sections 17, 18 each having the helical toothing 24a, b being engaged with each other. The helical gears 24a, b are each formed by grooves and bars which run obliquely to the main axis H and which extend circumferentially around the main axis H in alternating sequence. In the event of a relative rotation of the two ramp sections 17, 18, the two ramp sections 17, 18 slide off one another via the helical toothing 24a, b so that the two ramp sections 17, 18 are axially displaced relative to one another. As shown in FIG. 1, this linear movement is used to press the brake pads 8a, b together with the brake disc 9 and to fix the wheel.

It thus becomes a parking brake device 15 which can be actuated with a low expenditure of force, wherein the parking force F2 can be transmitted to the wheel brake device 5 in a reinforced manner by the ramp mechanism 16. As a result, a robust parking brake device 15 can be implemented in a simple manner, which can also be produced simply and inexpensively.

The stationary ramp section 17 has a straight toothing 25a on its inner circumference, which serves for the connection to the fixing section 19 with conjoint rotation. The straight toothing 25a is formed by several grooves and bars running parallel to the main axis H and in an alternating arrangement. The straight toothing 25a directly adjoins the collar 23 directed radially inward.

Figure 3A:
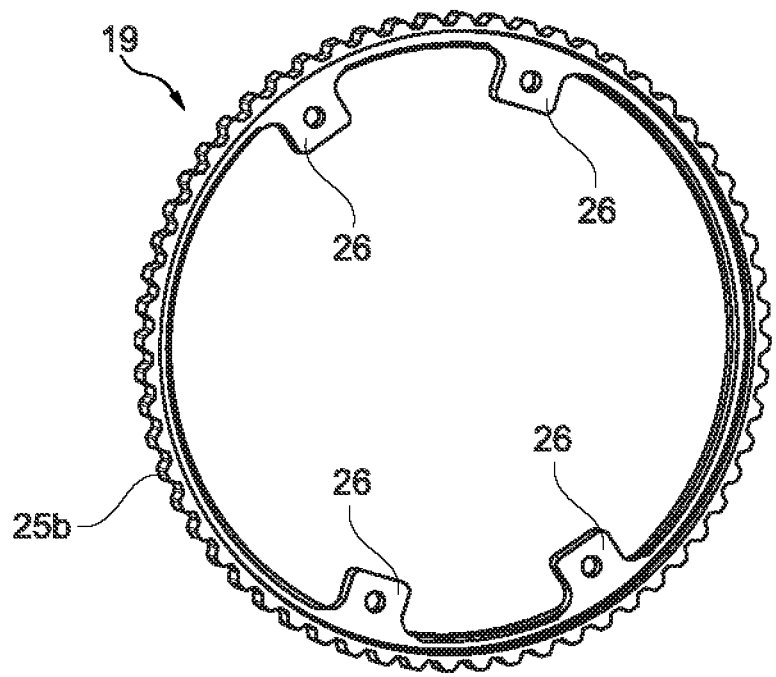
FIGS. 3A and 3B show a three-dimensional view of a fixing section and a housing cover of the wheel hub drive in FIG. 1.
Figure 3B:
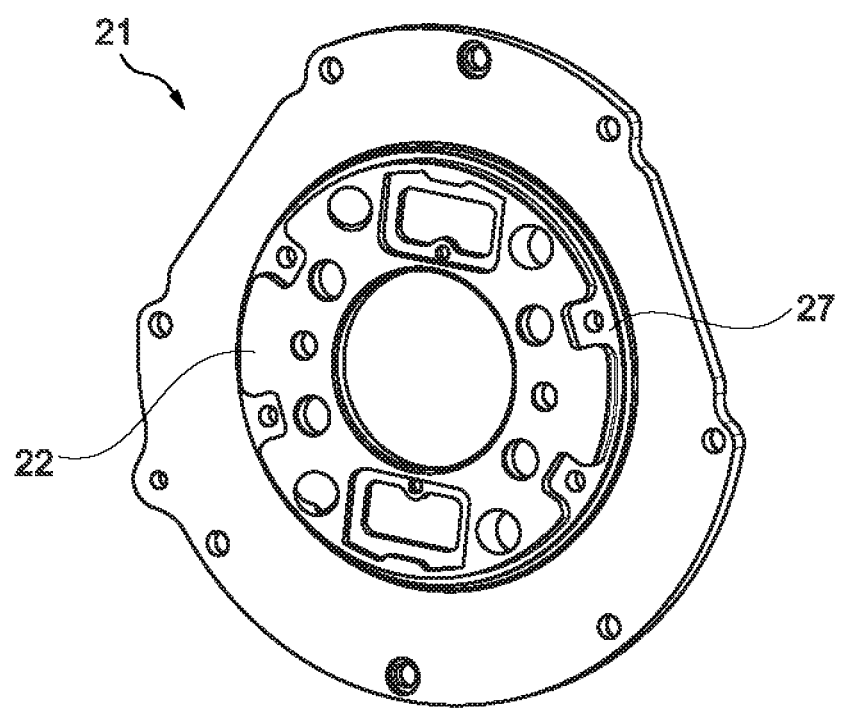

FIG. 3A shows the fixing section 19 in a three-dimensional representation and FIG. 3B shows the housing cover 21. The fixing section 19 is designed as a further toothed ring. The fixing section 19 has on its outer circumference a straight toothing 25b corresponding to the straight toothing 25a, the straight toothing 25a of the stationary ramp section 17 and the straight toothing 25b of the fixing section 19 jointly forming a plug-in toothing. For assembly, the stationary ramp section 17 can be plugged with its straight toothing 25a onto the straight toothing 25b of the fixing section 19 in the axial direction with respect to the main axis H. The stationary ramp section 17 can be pushed onto the fixing section 19 until the ramp section 17 rests with its collar 23 on an end face of the fixing section 19. The fixing section 19 can then be mounted on the housing cover 21 together with the preassembled ramp section 17. It can optionally be provided that the rotatable ramp section 18 is also already preassembled on the stationary ramp section 17. In an assembled state, the stationary ramp section 17 is therefore fixed in the axial direction with respect to the main axis H by the collar section 23 and in the circumferential direction by the straight toothing 25*a*, *b* on the drive housing 2, in particular the housing cover 21.

The fixing section 19 has multiple fastening tabs 26 directed radially inward, each of the fastening tabs 26 serving to receive a fastening means, for example a screw. The receiving section 22 forms a contour partner to the fixing section 19, the receiving section 22 having a negative contour 27 for this purpose. During assembly, the fixing section 19 is inserted into the negative contour 27 in a form-fitting manner on the receiving section 22. The fixing section 19 is then fixed to the housing cover 21 via the fastening means, so that the fixing section 19, in particular together with the stationary and optionally the rotatable ramp section 17, 18, is held captive.

LIST OF REFERENCE SYMBOLS

1 Wheel hub drive
2 Drive housing
3 Hub output
4 Bearing device
5 Wheel brake device
6 Inner carrier
7 Outer carrier
8*a*,*b* Brake pads
9 Brake disc
10 Wheel brake actuation device
11 Hydraulic wheel brake actuator
12 Pressure pad
13 Rotating brake partner
14 Rotating brake partner
15 Parking brake device
16 Ramp mechanism
17 Stationary ramp section
18 Rotatable ramp section
19 Fixation section
20 Parking actuation device
21 Cover housing
22 Cylinder section
23 Collar
24*a*, *b* Helical toothing
25*a*, *b* Straight toothing
26 Fastening straps
27 Negative contour
F1 Braking force
F2 Parking force
F3 Restoring force
H Main axis

The invention claimed is:

1. A wheel hub drive for a vehicle, the wheel hub drive comprising:
a drive housing;
a hub output for coupling to a driven wheel, the hub output being mounted rotatably relative to the drive housing;
a wheel brake configured to brake the hub output relative to the drive housing, the wheel brake having a stationary brake partner and a rotating brake partner, the stationary brake partner being connected to the drive housing for conjoint rotation therewith, and the rotating brake partner being connected to the hub output in at least one of a geared manner or for conjoint rotation therewith, the stationary and rotating brake partners being movable relative to one another when the wheel brake is actuated, and being frictionally connected to one another in a braking state,
a parking brake configured to fix the hub output relative to the drive housing, the stationary and rotating brake partners being movable relative to one another when the parking brake is actuated and being frictionally connected to one another in a parked state; and
the parking brake has a ramp mechanism, the ramp mechanism being configured to convert a rotary movement into a linear movement in order to transfer a parking force to at least one of the stationary or rotating brake partner, the ramp mechanism comprising a stationary and a rotatable ramp section, one of the stationary and the rotatable ramp sections has a helical toothing on an inner circumference thereof and the other of the stationary and the rotatable ramp sections has a helical toothing on an outer circumference thereof, the ramp sections being in engagement with one another to form the ramp mechanism via the helical toothings.

2. The wheel hub drive according to claim 1, wherein the stationary ramp section being at least one of connected to the drive housing for conjoint rotation therewith or being formed thereby, and the rotatable ramp section being rotatable about a main axis to implement a rotary movement, upon rotation of the rotatable ramp section, and the linear movement being transferable to at least one of the stationary and the rotatable ramp sections via the ramp mechanism.

3. The wheel hub drive according to claim 1, wherein the parking brake has a fixing section for fixing the stationary ramp section on the drive housing, the fixing section being mounted on the drive housing, and the stationary ramp section and the fixing section each being in engagement with one another via a straight toothing.

4. The wheel hub drive according to claim 3, wherein the wheel brake has a pressure pad for transmitting a braking force in an axial direction through at least one of the brake partners and, in an opposite axial direction, an end stop for the pressure pad being defined by at least one of the ramp sections, an axial position of the end stop formed by the ramp section being adjustable via the ramp mechanism, so that a wear readjustment for the wheel brake is implemented.

5. The wheel hub drive according to claim 1, wherein the wheel brake has a wheel brake actuator and the parking brake has a parking brake actuator, the parking brake actuator being actuatable independently of the wheel brake actuator.

6. The wheel hub drive according to claim 5, wherein the parking brake actuator is a manual parking brake actuator.

7. The wheel hub drive according to claim 5, wherein the parking brake actuator is a cable, a worm gear or a hydraulic actuator.

8. The wheel hub drive according to claim 1, wherein at least one of (a) the stationary brake partner is configured as at least one axially movable brake pad, or (b) the rotating brake partner is configured as at least one axially movable brake disc.

9. An axle arrangement for a vehicle, comprising two of the wheel hub drives according to claim 1.

10. A wheel hub drive for a vehicle, the wheel hub drive comprising:
a drive housing;
a hub output for coupling to a driven wheel, the hub output being mounted rotatably relative to the drive housing;
a wheel brake configured to brake the hub output relative to the drive housing, the wheel brake having a stationary brake partner and a rotating brake partner, the stationary brake partner being connected to the drive housing, and the rotating brake partner being connected to the hub output in at least one of a geared manner or for conjoint rotation therewith, the stationary and rotating brake partners being movable relative to one another when the wheel brake is actuated, and being frictionally connected to one another in a braking state, a parking brake configured to fix the hub output relative to the drive housing, the stationary and rotating brake partners being movable relative to one another when the parking brake is actuated and being frictionally connected to one another in a parked state;

the parking brake has a ramp mechanism with a rotatable ramp section configured to move linearly in an axial direction upon a rotational movement thereof to transfer a parking force to at least one of the stationary or rotating brake partner, the ramp mechanism comprising a stationary and a rotatable ramp section; and the parking brake further has a fixing section for fixing the stationary ramp section on the drive housing, the fixing section being mounted on the drive housing, and the stationary ramp section and the fixing section each being in engagement with one another via a straight toothing.

11. The wheel hub drive according to claim 10, wherein the stationary ramp section is at least one of connected to the drive housing for conjoint rotation therewith or formed thereby, and the rotatable ramp section engages the stationary ramp section.

12. The wheel hub drive according to claim 11, wherein one of the stationary or rotatable ramp sections has a helical toothing on an inner circumference thereof and the other of the stationary or rotational ramp sections has a helical toothing on an outer circumference thereof, the helical toothings being in engagement with one another.

13. The wheel hub drive according to claim 12, wherein the wheel brake has a pressure pad for transmitting a braking force in an axial direction through at least one of the brake partners and, in an opposite axial direction, an end stop for the pressure pad being defined by at least one of the ramp sections, an axial position of the end stop formed by the ramp section being adjustable via the ramp mechanism to provide wear readjustment for the wheel brake.

14. The wheel hub drive according to claim 10, wherein the wheel brake has a wheel brake actuator and the parking brake has a parking brake actuator, the parking brake actuator being actuatable independently of the wheel brake actuator.

15. The wheel hub drive according to claim 14, wherein the parking brake actuator is a manual parking brake actuator.

16. The wheel hub drive according to claim 14, wherein the parking brake actuator is a cable, a worm gear or a hydraulic actuator.

17. The wheel hub drive according to claim 10, wherein at least one of (a) the stationary brake partner is configured as at least one axially movable brake pad, or (b) the rotating brake partner is configured as at least one axially movable brake disc.

* * * * *